June 27, 1967 T. D. STUPAR 3,328,599
COMPARATOR USING DIFFERENTIAL AMPLIFIER MEANS
Filed Jan. 10, 1964
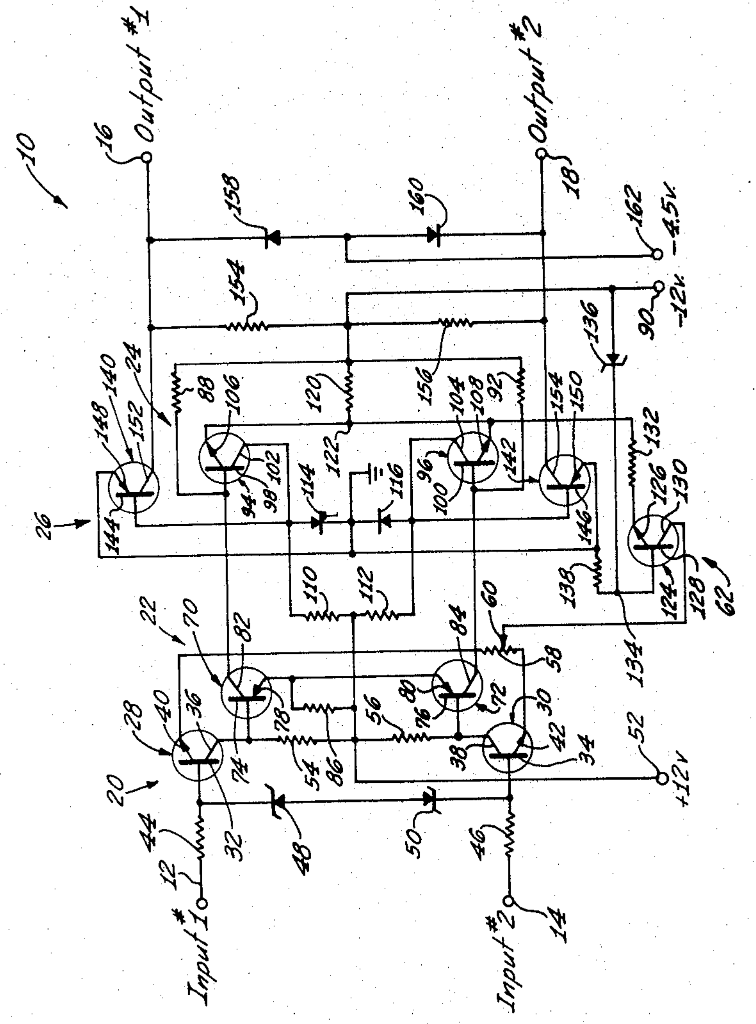
INVENTOR:
Timothy D. Stupar
By Smyth, Roston & Pavitt
Attorneys United States Patent Office 3,328,599 Patented June 27, 1967

3,328,599

COMPARATOR USING DIFFERENTIAL AMPLIFIER MEANS

Timothy D. Stupar, Venice, Calif., assignor to Minnesota Mining and Manufacturing Company, St. Paul, Minn., a corporation of Delaware Filed Jan. 10, 1964, Ser. No. 337,035
13 Claims. (Cl. 307—88.5)

The present invention relates to comparators, and more particularly to means for comparing two signals and indicating which of the two signals has the largest amplitude.

In many applications it is necessary to know which signal in a pair of signals has the largest amplitude. Under such circumstances the magnitude of the difference is immaterial. In order to make such a comparison it has been customary to employ a comparator that will compare the amplitudes of the two signals and indicate the difference. Although such comparators have been more or less effective in comparing the amplitudes of a pair of signals, they have not been entirely satisfactory for numerous reasons. Such comparators have been effective to compare the actual values of the signals. As a result, when the signals are very large, the difference may become a very small percentage of the signals. As a result, the comparator is unable to accurately indicate the differences of a small magnitude. In addition, there may be so-called common mode signals present in the two signals that will increase both signals and thereby reduce the accuracy of the comparator.

The present invention provides a comparator which overcomes the foregoing difficulties. More particularly, a comparator is provided which is extremely sensitive to the differences between a pair of signals and will produce a first logic signal when a first signal in the pair of signals is higher and a second logic signal when the second signal in the pair of signals is higher. In a comparator embodying one form of the present invention, a plurality of differential amplifiers are cascaded with each other. These amplifiers provide a pair of channels with each channel containing one of the signals. The amplifiers do not amplify the aboslute value of the amplitudes of the signals but do amplify the difference between the signals. In addition, feedback means are provided which are interconnected with two different stages of differential amplification. The input of the feedback is responsive to the sum of the signals in the two channels formed by the differential amplifiers so as to produce a sum signal. The feedback means is then effective to negatively feed the sum signal into a preceding stage of amplification. This will be effective to cancel out substantially all of the common mode signals. By canceling the common mode signals only the difference signal will remain. Accordingly, the gain of the differential amplifiers may be very high and therefore very sensitive to the differences between the two signals.

These and other features and advantages of the present invention will become readily apparent from the following detailed description of one embodiment thereof, particularly when taken in connection with the accompanying drawings, wherein like reference numerals refer to like parts, and wherein:

The figure is a schematic diagram of a comparator embodying one form of the present invention.

Referring to the drawings in more detail, the present invention is particularly adapted to be embodied in a signal comparator 10 for comparing the amplitudes of a pair of signals and indicating which of the signals has the largest amplitude. The comparator 10 includes two separate inputs 12 and 14 for being connected to sources of the two signals to be compared. The potential difference between the inputs 12 and 14 will be equal to the difference between the signals.

The comparator 10 includes a pair of outputs 16 and 18 that are effective to carry signals representing which of the input signals is largest. When the potential on the first input 12 is higher, i.e., more positive than the potential on the input 14, the comparator 10 will maintain the outputs 16 and 18 at a first logic level; for example, output 16 may be at ground potential and the output 18 at a predetermined reference level. When the potential on the second output 14 is higher, i.e., more positive than the potential on the input 12, the comparator 10 will maintain the outputs 16 and 18 at a second logic level. For example, the output 16 may be at some predetermined reference potential and output 18 at ground level.

More particularly, the comparator 10 includes a plurality of cascaded amplifying sections 20, 22 and 24 and an output section 26. The first amplifying section 20 includes a pair of transistor 28 and 30 having bases 32 and 34, collectors 36 and 38, and emitters 40 and 42. These two transistors 28 and 30 may have substantially identical characteristics so that they will be electrically balanced.

The base 32 of the first transistor 28 is connected to the first input 12 by means of a resistor 44. The potential on the base 32 will thus be determined by the potential on the input 12. The base 34 of the second transistor 30 is connected to the second input 14 by means of a second resistor 46 that is substantially identical to the first resistor 44. As a consequence, the potential on the base 34 will thus be determined by the potential on the input 14 in the same way as the potential on the first input 12.

A pair of diodes 48 and 50 may be disposed between the two bases 32 and 34. These diodes 48 and 50 are preferably so-called Zener diodes and are arranged "back-to-back." A Zener diode is a semiconductive device that conducts in the forward direction with a minimum voltage drop thereacross. However, when biased in the reverse direction, the diode will not conduct as long as the bias is less than the so-called Zener level. If the reverse bias exceeds the Zener level, the diode will conduct in the reverse direction without damaging the diode. The resistance of the diode when conducting in the reverse direction is an inverse function of the current, and the voltage thereacross will remain constant at the Zener level.

As long as the potential difference between the inputs 12 and 14 is less than the Zener level, at least one of the diodes 48 and 50 will not conduct. As a result, as long as the potential difference between the inputs 12 and 14 is less than the Zener level, the diodes 48 and 50 will not affect the potential difference between the inputs 12 and 14 and the potential difference between the bases 32 and 34 will be equal to the potential difference between the inputs 12 and 14. In the event the potential difference at the inputs 12 and 14 exceeds the Zener level, one of the diodes 48 or 50 will be reverse biased sufficiently to conduct. The combination of the resistors 44 and 46 and the resistance of the reversely conducting diode will maintain a predetermined voltage between the bases 32 and 34.

It will thus be seen that these two diodes 48 and 50 and the two resistors 44 and 46 will be effective to limit the maximum potential difference between the two bases 32 and 34 to a level that will not damage the comparator 10.

The collector 36 of the transistor 28 is connected to a source 52 of a positive potential by a load resistor 54. The second collector 38 is connected to a resistor 56. The resistor 56 is, in turn, connected to the source 52 whereby the resistor 56 will form a load for the transistor 30. Preferably, the two resistors 54 and 56 are identical so that the two transistors 28 and 30 will be balanced against each other.

The emitter 40 of the first transistor 28 is connected to one end of a potentiometer 58 having an adjustable center tap 60. The emitter 42 of the transistor 30 is connected to the other end of the potentiometer 58. The movable center tap 60 of this potentiometer 58 is connected with a current source 62. By varying the position of the center tap 60, the currents through the emitters 40 and 42 may be balanced.

It will thus be seen that these two transistors 28 and 30 are interconnected to form a single-stage differential amplifier. By properly adjusting the position of the center tap 60, this amplifying section 20 can be balanced in relation to the potentials on the two inputs 12 and 14. When the potentials on the two inputs 12 and 14 are identical, the current flow through the collectors 36 and 38 and resistors 54 and 56 on the opposite sides of the amplifier will be identical. If the potentials are not identical, the two transistors 28 and 30 will act as a differential amplifier and will amplify the difference. The resultant difference signal will be the difference between the currents in the resistors 54 and 56 and the potential difference between the bases 32 and 34.

The second amplifying section 22 includes a pair of transistors 70 and 72 having bases 74 and 76, emitters 78 and 80, and collectors 82 and 84. These transistors 70 and 72 have substantially identical characteristics.

The base 74 of the transistor 70 is connected to the collector 36 of the transistor 28. The potential on this base will thus be determined by the potential drop produced by the collector current flowing through the resistor 54. The base 76 of the transistor 72 is connected to the collector 38 of the transistor 30. It may thus be seen that the voltage on the base 76 will be determined by the potential drop produced across the resistor 56 by the current from the collector 38.

The emitters 78 and 80 of the two transistors 70 and 72 are interconnected directly with each other so that they will always be at the same potential. The junction between the two emitters 78 and 80 is connected with the source of positive potential by means of a resistor 86. The collector 82 of the transistor 70 is connected to a resistor 88. The resistor 88, in turn, leads to a source 90 of negative potential. The resistor 88 will thus form a load for one side of the second stage 22.

The collector 84 for the opposite transistor 72 is connected to a resistor 92. The resistor 92 is substantially identical to the resistor 88 and leads to the negative source 90. This resistor 92 will thus form a load for the second side of the second stage 22 that is identical to the first stage.

The currents flowing through these resistors 88 and 92 and, therefore, the voltages on the collectors 82 and 84 will differ from each other by an amount that is a function of the difference between the potentials on the inputs 12 and 14 and the bases 32 and 34.

The third amplifying section 24 includes transistors 94 and 96 having substantially identical characteristics. These transistors 94 and 96 include bases 98 and 100, collectors 102 and 104, and emitters 106 and 108. The base 98 of the first transistor 94 is connected directly to the collector 82 of the transistor 70. The base 98 will thus be at a potential that is a function of the voltage drop across the resistor 88.

The base 100 of the second transistor 96 is connected directly to the collector 84 of the transistor 72 and will thus be at a potential that is a function of the vlotage drop across the resistor 92. The potential difference between the two bases 98 and 100 will thus be a function of the magnitude of the difference signal amplified by the first two stages 20 and 22.

The collector 102 is connected to the source 52 of positive potential by a load resistor 110, while the collector 104 is connected to the source 52 by a second resistor 112. These resistors 110 and 112 are substantially identical to each other and form loads for the opposite sides of the third stage 24. In addition, the collector 102 is connected to ground by a diode 114, while the collector 104 is connected to ground by a second diode 116. These diodes 114 and 116 are disposed "back-to-back," i.e., they are arranged in opposed polarity with the cathodes connected to ground. The two diodes 114 and 116 will permit the collectors 102 and 104 becoming negative with respect to ground, but will be effective to prevent the collectors 102 and 104 becoming more positive than ground.

The emitters 106 and 108 of the two transistors 94 and 96 are connected directly to each other. The junction 122 between the two emitters 106 and 108 is, in turn, interconnected with a power supply 90. This supply 90 is effective to provide a voltage suitable for driving the transistors. In the present instance, this supply 90 provides a negative voltage that is symmetrical with respect to the voltage from the first source 52, i.e., it is of equal amplitude but of opposite polarity.

It will thus be seen that this pair of transistors 94 and 96 will form a third balanced differential amplifier which will be responsive to the difference between the voltages on the two load resistors 88 and 92. The current in the collector 102 will produce a voltage drop across the resistor 110 that is a function of the signal in one side of the comparator 10. The current in the collector 104 will produce a voltage drop across the resistor 112 that is a function of the signal in the other side of the comparator 10. The difference between the voltage drops on the resistors 110 and 112 will thus be a function of the difference signal in the two sides of the differential amplifiers.

The diodes 114 and 116 will permit the collectors 102 and 104 to go negative relative to ground. However, as soon as one of the collectors 102 or 104 starts to go positive, the diode 114 and 116 will conduct. As a result, if there is a difference signal present, one of the collectors will swing positive until it reaches ground potential, where it will remain. However, the other collector will be depressed below ground potential by an amount that is a function of the difference.

The current flow from both of the emitters 106 and 108 will flow through the resistor 120. It will thus be seen that the voltage drop across the resistor 120 and, therefore, the potential at the junction 122 will be a function of the sum of the two signals in the two sides of the amplifier stages 20, 22 and 24. If there is a difference between the potentials on the inputs 12 and 14, it will cause the signals in the two sides of the comparator 10 to swing in opposite directions by equal amounts. Thus, a difference signal will not produce a signal on the resistor 120. However, if the same signal is present in both sides, i.e., a common mode signal, it will produce a signal across the resistor 120.

It should be noted that under some circumstances, a common mode signal may distort the operation of the comparator 10, and it is therefore desirable to eliminate such common mode signals. In the present instance, this is accomplished by means of the current source 62 for the emitters 40 and 42 of the first stage 20. The current source 62 includes a transistor 124 having an emitter 126, base 128, and collector 130. The emitter 126 is connected to a resistor 132 which leads to the junction 122 between the two emitters 106 and 108. It will thus be seen that the emitter 126 will have a voltage thereon that is a function of the sum of the signals in the comparator 10. Thus, as previously stated, the difference signals will cancel each other, and the only signal at the junction 122 will be the common mode signal.

The base 128 of the transistor 124 is interconnected with a junction 134 having a substantially constant voltage thereon. In the present embodiment, this junction 134 is formed between a Zener diode 135 connected with the source 90 of negative potential and a resistor 138 connected to ground. This will be effective to maintain a substantially constant reference bias potential on the base 128 of the transistor 124.

The collector 130 of the transistor 124 is interconnected with the movable center tap 60 in the potentiometer 58. It will thus be seen that this transistor 124 will function as a variable current source for the two emitters 40 and 42 of the two input transistors 28 and 30. Since the bias on the emitter 126 of the transistor 124 is responsive to the voltage across the resistor 120, the transistor 124 will be responsive only to common mode signals. This, in turn, will be effective to control the amount of current flowing from the collector 130 to the emitters 40 and 42 of the input transistors 28 and 30.

The fluctuations in the voltage across the resistor 120 will cause the current from the source 62 to vary in a direction that will oppose, i.e., 180° out of phase, the common mode signal. By a proper balancing of the various parameters, this effect can be made to produce a substantially complete cancellation of the common mode signals. It will thus be seen that the signals formed by the two voltages across the load resistors 54 and 56 and also the difference therebetween will be a function of the difference between the potentials on the two inputs 12 and 14.

The output stage 26 includes a pair of substantially identical transistors 140 and 142 which include bases 144 and 146, emitters 148 and 150 and collectors 152 and 154. The base 144 of the first transistor 140 is connected to the collector 102 of transistor 94 in the third stage 24. The base 146 of the transistor 142 is connected to the collector 104 of the transistor 96. The emitters 148 and 150 of both transistors 140 and 142 are connected directly with the ground. It will thus be seen that the bias between the emitter 148 and base 144 of the transistor 140 will be equal to the potential drop across the diode 114. Similarly, the bias between the emitter 150 and the base 146 will be equal to the voltage across the second diode 116.

The collector 152 of the first output transistor 140 is interconnected with the negative supply 90 by means of a load resistor 155. The collector 154 of the second output transistor 142 is also interconnected with the supply 90 by means of a load resistor 156. These two resistors 155 and 156 are preferably substantially identical to each other.

When the transistor 94 is not conducting, the collector 102 will be clamped to the ground potential by the diode 114. This will be effective to bias the transistor 140 to cutoff and no current will flow through the collector 152. This will permit the collector 152 to have a negative potential. Conversely, when the transistor 94 is conducting, the collector 102 will be substantially negative relative to ground. This will be effective to cause the transistor 140 to conduct with a current flowing through the collector 152 and the resistor 155. The collector 152 will be clamped to ground potential. The transistor 140 will thus act as an "ON-OFF" switch that will place the collector 152 at ground potential or at some negative potential with respect to ground. The transistor 142 will function in the same manner but under the opposite condition. More particularly, when the transistor 140 is cut off, the transistor 142 will be conducting, and the collector 154 will be at ground potential. When the transistor 140 is conducting, the transistor 142 will be cut off, and the collector 154 will be negative relative to ground.

The outputs 16 and 18 may be connected directly to the collectors 152 and 154, respectively. The outputs 16 and 18 will thus be at ground potential or some potential negative with respect to ground, depending upon whether the transistors 140 and 142 are conducting.

A pair of diodes 158 and 160 may be interconnected between the outputs 16 and 18. These two diodes 158 and 160 are "back-to-back" or of reversed polarity with their plates forming a junction. The junction between the diodes 158 and 160 is interconnected with a source of a reference voltage. This voltage will normally be negative and of some level such as −4.5 volts. When the output transistor 140 is conductive, the cathode of the diode 158 will be at ground level. However, when the transistor 140 is not conductive, the collector 152 will tend to fall to the potential of the source 90. When this occurs, the cathode of the diode 158 will become more negative than the plate, and the diode 158 will become conductive. This will produce a current flow between the sources 90 and 162 and through the resistor 155 and diode 158. Under these circumstances, the output 16 will be clamped to the potential of the reference source 162.

The transistor 142 will be operating in the opposite manner so that its conductive state will be opposite to that of the transistor 140. When the output 16 is at the reference potential transistor 142 is switched conductive and the output 18 will be clamped to ground. When the potential difference between the two inputs 12 and 14 reverses, and the transistor 140 clamps output 16 to ground, the transistor 142 will be non-conductive. A current may then flow between the sources 90 and 162 through the resistor 156 and diode 160. The output 18 will then be held at the potential of the reference source.

In order to employ the present comparator 10 for comparing the magnitudes of two signals, the inputs 12 and 14 are separately connected to a pair of sources of the two signals. The outputs 16 and 18 may then be connected with means that will respond to the output signals and indicate which is the larger signal or will actuate a subsequent device.

After the comparator 10 has been interconnected in the foregoing manner and properly energized, the two signals on the inputs 12 and 14 will be coupled to the bases 32 and 34 of transistors 28 and 30 in the first stage 20. In the event a common mode signal is present on both inputs 12 and 14, the two bases 32 and 34 will be biased by the same amount. This will tend to cause the current in the collectors 36 and 38 to increase or decrease by identical amounts and provide identical signals across the resistors 54 and 56. These two signals will be coupled through both sides of the stage 22 to the bases 98 and 100 of the transistors 94 and 96 in the third stage 24.

The currents in the collectors 100 and 104 will increase or decrease by identical amounts so as to produce identical signals across the resistors 110 and 112. At the same time, a current representing the sum of these two signals will flow through the resistor 120 whereby the potential on the junction 122 will be a function of the common mode signal. The voltage signal at junction 122 is coupled to the emitter 126 of the transistor 124 in the current source 62. This will vary the current through the emitters 40 and 42 in the transistors 28 and 30 of the first stage 20. The changes in the current fed back through the emitters 40 and 42 will be 180° out-of-phase with the changes produced by the common mode signal. As a result, the common mode portion of any signals present at the input to the first stage 20 will be cancelled whereby only the difference portions of the signals will be coupled through the subsequent stages to the resistors 110 and 112.

In the event the input 12 is more positive than the input 14, the base 32 will be more positive than the base 34 by an amount that does not exceed the Zener level of the diodes 48 and 50. This will cause the transistor 28 to be biased more conductive and the transistor 30 to be biased less conductive. The resultant difference between the voltages across the resistors 54 and 56 will be coupled through the second stage 22 and third stage 24 so as to produce an amplified difference signal across the resistors 110 and 112. As previously described, the common portions of the signal will be virtually eliminated and only the difference will remain.

The transistor 94 will be biased conductive so that a current can flow between the sources 52 and 90 by way of the resistor 110, transistor 94 and resistor 120. This current flow will be effective to make the collector 102 and the base 144 of transistor 140 negative with respect to ground. This, in turn, will switch the transistor 140 conductive. Current will then flow from the source 90 through the resistor 155, collector 152 and emitter 148 to ground. As a consequence, the output 16 will be clamped at ground potential. At the same time, however, the potential on the base 100 of transistor 96 will bias the transistor less conductive or non-conductive.

The collector 104 will then tend to rise toward the positive potential of the source 52. However, the diode 116 will prevent the collector 104 becoming more positive than ground. This, in turn, will cause the base 146 of transistor 142 to be held at ground potential so that no current will flow through the collector 154. Under these circumstances, the collector 154 will tend to become more negative and approach the potential of the source 90. However, when the collector 154 has the same potential as the reference source 162, a current will flow between the sources 90 and 162 by way of the resistor 156 and diode 160. This will cause the output 18 to be clamped to the potential of the reference source.

It may thus be seen that when the signal on input 12 is more positive than the signal on input 14, the output 16 will be clamped to ground level and the output 18 will be clamped to the same potential as source 162.

When the signal on input 14 becomes more positive than the signal on input 12, the same action will occur except that each of the transistors will be in the opposite conductive state. Thus, the transistor 142 will be switched conductive and the transistor 140 will be switched non-conductive. This will cause the output 18 to be clamped to ground and the output 16 to be clamped to the potential of source 162.

It will thus be seen that the potentials on the outputs 16 and 18 may be caused to switch between two opposite logic states in response to whether the potential on the input 12 is more positive or more negative than the potential on the input 14. By employing the differential amplifiers, it is possible to detect very small differences between the signals without regard to the absolute magnitude of the input signals. Furthermore, because of the negative feedback from the current source 62 to the input stage 20, the common mode portions of the signals will be cancelled and only the difference portions of the signals will be amplified. Thus, only the difference between the two signals will be effective to actuate the comparator. The number and gain of the stages of differential amplification may be large enough to produce the desired sensitivity. Since all common mode portions of the signals are rejected, the various components in the comparator will not be overloaded even though the absolute values of the signals are large. Furthermore, by providing the voltage-limiting diodes 48 and 50 between the bases 32 and 34, very high gain and sensitivity may be provided so as to detect very small differences between the input signals. In the event of extremely large differences, the diodes 48 and 50 will limit the potential difference between the bases 32 and 34 to a level which will insure the outputs 16 and 18 being at the required logic levels but will be effective to prevent damage to the comparator.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A comparator for comparing the amplitudes of a pair of signals and indicating which has the largest amplitude, said comparator including the combination of:

a first input for receiving the first of the signals and a second input for receiving the second of the signals, differential amplifying means having a pair of parallel channels, means interconnecting the first of the channels with the first input for supplying the first signal to the first channel and interconnecting the second channel with the second input for supplying the second signal to the second channel, said differential amplifying means being effective to amplify the difference between the signals in the two channels, a pair of outputs, a source of a reference potential, a pair of switch means interconnected with the two channels and responsive to the difference between the signals in the two channels, the first of the switch means being effective to connect the first output with the source of reference potential only when the amplitude of the signal in the first channel is greater than the amplitude of the signal in the second channel, the second of the switch means being effective to connect the second output with the source of reference potential only when the amplitude of the signal in the second channel is greater than the amplitude of the signal in the first channel.

2. A comparator for comparing the amplitudes of a pair of signals and indicating which signal has the largest amplitude, said comparator including the combination of:

a pair of inputs for receiving the pair of signals, at least one stage of differential amplifiers forming a first channel connected to the first input for receiving the first of said signals and a second channel connected to the second input for receiving the second of said signals, a source of ground potential and a source of a reference potential, a pair of switch means interconnected with the two channels so as to be responsive to the difference between the signals in the two channels, the first of said switch means being interconnected with said sources of ground potential and reference potential and effective to become conductive to the source of ground potential only when the amplitude of the signal in the first channel is greater than the amplitude of the signal in the second channel and conductive to the source of reference potential only when the amplitude of the signal in the second channel is greater than the amplitude of the signal in the first channel, the second switch means being effective to become conductive to the source of ground potential only when the amplitude of the signal in the second channel is greater than the amplitude of the signal in the first channel and to become conductive to the source of reference potential only when the amplitude of the signal in the first channel is greater than the amplitude of the signal in the second channel.

3. A comparator for comparing the amplitudes of a pair of signals and indicating which signal has the largest amplitude, said comparator including the combination of:

a pair of inputs for receiving the pair of signals, a plurality of differential amplifiers cascaded with each other to form a pair of parallel channels for amplifying the difference between the signals in the two channels, means interconnecting the first channel with the first input for supplying the first signal to the first channel and interconnecting the second channel with the second input for supplying the second signal to the second channel, a pair of outputs, sources of a ground potential and a reference potential, switch means interconnected with the outputs and with the source of ground potential and the source of reference potential, said switch means being interconnected with the two channels and responsive to the difference between the signals in the two channels, said switch means being effective to interconnect the first output with the source of ground potential and the second output with the source of reference potential when the amplitude of the signal in the first channel is greater than the amplitude of the signal in the second channel, said switch means being effective to interconnect the second output with the source of ground potential and the first output with the source of reference potential when the amplitude of the signal in the second channel is greater than the amplitude of the signal in the first channel, and feedback means interconnected with an output for one of the differential amplifiers so as to be responsive to the sum of the two signals in the two channels at said output to provide a sum signal, said feedback means being interconnected with an input to one of the preceding differential amplifiers to negatively feed the sum signal into the preceding differential amplifier.

4. A comparator for comparing the amplitudes of a pair of signals and indicating which signal has the greatest amplitude, said comparator including the combination of:

a pair of inputs for receiving the pair of signals, at least one pair of differential amplifiers cascaded with each other to form a pair of channels, said cascade differential amplifiers being effective to amplify the difference between the signals in the two channels, at least the first differential amplifier having a pair of transistors, each of said transistors having a base electrode, an emitter electrode and a collector electrode, said base electrodes being interconnected with their respective inputs so as to separately receive the individual input signals and couple the signals into the channels, a source of reference potential, a pair of switch means interconnected with the two channels and with the source of reference potential, said switch means being responsive to the difference between the signals so that one of the switch means will become conductive to the source of reference potential only when the amplitude of the signal in the first channel is the greatest and the other of the switch means will only become conductive to the source of reference potential when the amplitude of the signal in the second channel is greatest.

5. A comparator for comparing the amplitudes of a pair of signals and indicating which signal has the greatest amplitude, said comparator including the combination of:

a pair of inputs for receiving the pair of signals, a first differential amplifier having a pair of transistors, each of said transistors having a base electrode, an emitter electrode and a collector electrode, said base electrodes being interconnected with the respective inputs so as to separately receive the individual input signals, a current source interconnected with the emitter electrodes in each transistor for supplying a current to the pair of emitter electrodes, at least one additional differential amplifier interconnected with the collector electrodes and cascaded with the first differential amplifier to form a pair of parallel channels, said differential amplifiers being effective to amplify the difference between the signals in the two channels, a source of reference potential and a source of ground potential, first switch means interconnected with at least one of the channels and with the sources of reference and ground potentials, said first switch means being responsive to the difference between the signals in the two channels so that the switch means will become conductive to the source of reference potential only when the amplitude of the signal in the first channel is greater than the amplitude of the signal in the second channel and conductive to the source of ground potential only when the amplitude of the signal in the second channel is greater than the amplitude of the signal in the first channel, second switch means interconnected with at least the other one of the channels and with the sources of reference and ground potentials, said second switch means being responsive to the difference between the signals in the two channels so that the second switch means will become conductive to the source of reference potential only when the amplitude of the signal in the second channel is greater than the amplitude of the signal in the first channel and conductive to the source of ground potential only when the amplitude of the signal in the first channel is greater than the amplitude of the signal in the second channel, said current source being interconnected with one of the additional differential amplifiers and responsive to the sum of the signals in the two channels to vary the current to the pair of emitter electrodes in the transistors of the first differential amplifier in response to the sum signal.

6. A comparator for comparing the amplitudes of a pair of signals and indicating which signal has the largest amplitude, said comparator including the combination of:

a pair of inputs for receiving the pair of signals, differential amplifier means cascaded with each other to form a pair of parallel channels for amplifying the difference between the signals in the two channels, means interconnecting the first channel with the first of the inputs for supplying the first of the signals to the first channel and interconnecting the second channel with the second of the inputs for supplying the second of the signals to the second channel, a pair of outputs, a source of ground potential and a source of a reference potential, a pair of diodes interconnected with the outputs and with the source of reference potential, said diodes being reversed biased so that only one of the diodes can conduct at a time, a pair of transistors having first electrodes, second electrodes and third electrodes, each of the transistors being disposed in a different one of the channels and having the first electrode connected to a different one of the outputs, the second electrode connected to the source of ground potential and the third electrode connected to the differential amplifier means in its respective channel to be responsive to the signal from the differential amplifier means in its respective channel so that only one of the transistors can be conductive at any one time and so that when one of the transistors is conductive the first and second electrodes of that transistor will be effectively connected to the source of ground potential and the diodes will be biased so that the first electrode of the other transistor will be connected to the reference source, and feedback means interconnected with the differential amplifier means in the two channels and responsive to the sum of the two signals from the differential amplifier means in the channels to provide a sum signal and to negatively feed the sum signal to the differential amplifier means in the two channels to substantially cancel any signals that are common to both channels.

7. A comparator for comparing the amplitudes of a pair of input signals and indicating which signal has the larger amplitude, said comparator including the combination of:

a pair of inputs for receiving the pair of input signals, differential amplifying means having a pair of parallel channels each associated with a different one of the two channels, said differential amplifying means being effective to amplify the difference between the signals in the two channels, means interconnecting the differential amplifying means in the two channels with the inputs for supplying the first of the input signals to the differential amplifying means in the first channel and the second of the input signals to the differential amplifying means in the second channel, means providing first and second reference potentials, first and second output lines, and means respectively connecting the first and second output lines to the differential amplifying means in the first and second channels and to the means for the first and second reference potentials for producing the first reference potential on the first output line and the second reference potential on the second output line for a difference of a first polarity between the respective amplitudes of one of the input signals in the pair and the other input signal in the pair and for producing the second reference potential on the first output line and the first reference potential on the second output line for a difference between the respective amplitudes of the one input signal in the pair and the other input signal in the pair of a second polarity opposite to the first polarity.

8. The comparator set forth in claim 7, including, means including a current source for summing the signals from the differential amplifying means in the pair of parallel channels to produce a current having characteristics representing a common mode signal from the differential amplifying means in the pair of channels, and means responsive to the current from the current source for introducing such current to the differential amplifying means in the pair of channels to minimize the common mode signal in the differential amplifying means.

9. A comparator for comparing the amplitudes of a pair of input signals and indicating which has the larger amplitude, said comparator including the combination of:

a first input for receiving the first of the input signals, a second input for receiving the second of the input signals, differential amplifying means having a pair of parallel channels each associated with a different one of the two channels for amplifying the difference between the input signals in the two channels, means interconnecting the differential amplifying means in the first of the channels with the first input for suplying the first input signal to the differential amplifying means in the first channel, means interconnecting the differential amplifying means in the second channel with the second input for supplying the second signal to the differential amplifying means in the second channel, a first output, a second output, first switching means having conductive and non-conductive states, second switching means having conductive and non-conductive states, means for providing a first reference voltage, means for providing a second reference voltage, means interconnecting the first output, the first switching means, the first and second reference voltage means and the differential amplifying means to provide the first reference voltage on the first output for a difference of a first polarity between the respective amplitudes of the first and second input signals and to provide the second reference voltage on the first output for a difference of a second polarity between the respective amplitudes of the first and second input signals where the second polarity is different from the first polarity, and means interconnecting the second output, the second switching means, the first and second reference voltage means and the differential amplifying means to provide the second reference voltage on the second output for a difference of the first polarity between the respective amplitudes of the first and second input signals and to provide the first reference voltage on the second output for a difference of the second output for a difference of the second polarity between the respective amplitudes of the first and second input signals.

10. A comparator for comparing the amplitudes of a pair of input signals and indicating which input signal has the larger amplitude, said comparator including the combination of:

a pair of inputs for receiving the pair of input signals, differential amplifying means having a pair of parallel channels, said differential amplifying means in the pair of channels being interconnected to the pair of inputs for individually receiving the pair of signals, said differential amplifying means being effective to amplifying the difference between the input signals in the two channels, the differential amplifying means including a first point common to the pair of channels and a second point anterior to the first common point and common to the pair of channels, feedback means including a current source interconnected with the differential amplifying means in the pair of channels at the first common point and at the second common point, said feedback means being responsive to the sum of the two signals in the channels at the first common point to provide from the current source a current having characteristics representing such sum, said feedback means being effective to negatively feed the current from the current source into the differential amplifying means in the pair of channels at the second common point, means providing first and second reference potentials, first and second output lines, means interconnecting the first and second reference potential means, the first output line and the differential amplifying means in one of the parallel channels to provide the first reference potential on the first output line for a difference of a first polarity between the respective amplitudes of one of the input signals in the pair and the other input signal in the pair and to provide the second reference potential on the first output line for a difference of a second polarity between the respective amplitudes of the one input signal in the pair and the other input signal in the pair where the second polarity is opposite to the first polarity, and means interconnecting the first and second reference potential means, the second output line and the differential amplifying means in the other of the parallel channels to provide the second reference potential on the second output line for a difference of the first polarity between the respective amplitudes of the one input signal in the pair and the other input signal in the pair and to provide the first reference potential on the second output line for a difference of the second polarity between the respective amplitudes of the one input signal in the pair and the other input signal in the pair.

11. A comparator for comparing the amplitudes of a pair of input signals and indicating which input signal has the larger amplitude, said comparator including the combination of:

a pair of inputs for receiving the pair of input signals, differential amplifying means defining a pair of parallel channels and being effective to amplify the difference between the signals in the pair of channels, means interconnecting the differential amplifying means in the pair of channels with the inputs for supplying a first one of the input signals to the differential amplifying means in the first channel and the second of the input signals to the differential amplifying means in the second channel, a pair of outputs, a source of a first reference potential, a second source of a second reference potential different from the first reference potential, switch means interconnected with the differential amplifying means in the pair of channels and with the two outputs and with the sources of first and second reference potentials, said switch means being responsive to the difference between the signals in the differential amplifying means in the pair of channels to connect the first output with the source of first reference potential and the second output with the source of second reference poential when the amplitude of the signal in the first channel is larger than the amplitude of the signal in the second channel and to connect the second output with the source of first reference potential and the first output with the source of second reference potential when the amplitude of the signal in the second channel is larger than the signal in the first channel.

12. A comparator for comparing the amplitudes of a pair of input signals and indicating which input signal has the larger amplitude, said comparator including the combination of:

a pair of inputs for receiving the pair of input signals, differential amplifying means defining a pair of parallel channels, said differential amplifying means in the pair of channels being interconnected to the inputs for receiving the pair of input signals and amplifying the difference between the pair of input signals in the pair of channels, a source of a first reference potential, a source of a second reference potential different from the first reference potential, a pair of switch means interconnected with the differential amplifying means in the pair of channels and with the sources of the first and second reference potential, said switch means being responsive to the difference between the signals in the two channels to connect a first one of said switch means to the source of the first reference potential and the other switch means to the source of the other reference potential when the amplitude of the signal in the first channel is greater than the amplitude of the signal in the second channel and to connect the other of said switch means to the source of the first reference potential and the first one of the switch means to the source of the second reference potential when the amplitude of the signal in the second channel is greater than the amplitude of the signal in the first channel, the differential amplifying means having first and second points common to the pair of channels, the second point being anterior to the first point, and feedback means being interconnected with the differential amplifying means in the pair of channels at the first point and at the second point to produce at the first point a signal representing the sum of the signals from the differential amplifying means in the channels and to negatively feed the sum signal into the differential amplifying means at the second point in the two channels to minimize any signals common to the differential amplifying means in the pair of channels.

13. A comparator for comparing the amplitudes of a pair of input signals and indicating which signal has the greater amplitude, said comparator including the combination of:

a pair of inputs for receiving the pair of input signals, a first differential amplifier having a pair of transistors, each of said transistors having a first electrode, a second electrode an a third electrode, the first one of the electrodes in each transistor being interconnected with a different one of the inputs in the pair to individually receive a particular one of the input signals, a current source interconnected with the second one of the electrodes in each transistor for supplying a current to that pair of electrodes, a second differential amplifier cascaded with the first differential amplifier to form a pair of parallel channels, said first and second differential amplifiers being effective to amplify the difference between the input signals in the two channels, said current source being interconnected with one of the additional differential amplifiers and responsive to the sum from the second differential amplifier of the signals in the two channels, said current source being effective to vary the current supplied to the second pair of electrodes in response to the sum signal to minimize any signals common to the two channels, a source of a first reference potential, a source of a second reference potential, first means connected to the second differential amplifier and to the sources of the first and second reference potentials for providing the first reference potential for a difference of a first polarity between the pair of input signals and for providing the second reference potential for a difference of a second polarity between the pair of input signals where the second polarity is opposite to the first polarity, and second means connected to the second differential amplifier and to the sources of the first and second reference potentials for providing the second reference potential for a difference of the first polarity between the pair of input signals and for providing the first reference potential for a difference of the second polarity between the pair of input signals.

References Cited

UNITED STATES PATENTS

| | | | |
|---|---|---|---|
| 2,763,838 | 9/1956 | McConnell | 330—69 X |
| 3,025,414 | 3/1962 | McVey. | |
| 3,046,487 | 7/1962 | Matzen et al. | 330—69 X |
| 3,189,840 | 6/1965 | Braymer et al. | |
| 3,213,298 | 10/1965 | Luke. | |
| 3,217,183 | 11/1965 | Thompson et al. | |

ROY LAKE, *Primary Examiner.*

F. D. PARIS, J. B. MULLINS, *Assistant Examiners.*